(12) United States Patent
Figura et al.

(10) Patent No.: US 10,634,217 B2
(45) Date of Patent: Apr. 28, 2020

(54) WORM GEAR

(71) Applicant: FORD GLOBAL TECHNOLOGIES, LLC, Dearborn, MI (US)

(72) Inventors: Michael Georg Figura, Dormagen (DE); Erik Jürgen Stumpf, Bedburg (DE); Thomas Marotzke, Hohen Neuendorf (DE); Fabian Wendt, Berlin (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 197 days.

(21) Appl. No.: 14/255,594

(22) Filed: Apr. 17, 2014

(65) Prior Publication Data

US 2014/0311267 A1 Oct. 23, 2014

(30) Foreign Application Priority Data

Apr. 19, 2013 (DE) .......................... 10 2013 207 142

(51) Int. Cl.
*F16H 1/16* (2006.01)
*B62D 5/04* (2006.01)
(Continued)

(52) U.S. Cl.
CPC ............. *F16H 1/16* (2013.01); *B62D 5/0409* (2013.01); *F16H 55/24* (2013.01); *F16H 2057/0213* (2013.01); *Y10T 74/19828* (2015.01)

(58) Field of Classification Search
CPC .............. F16H 1/16; F16H 2057/0213; F16H 2057/127; F16H 57/021; F16H 57/039; H02K 7/081
(Continued)

(56) References Cited

U.S. PATENT DOCUMENTS 1,866,339 A * 7/1932 Apple .................... H02K 7/081
                                                                310/66
2,640,552 A * 6/1953 Chillson ............... B64C 11/325
                                                                188/187
(Continued)

FOREIGN PATENT DOCUMENTS

BE          504665 A     11/1952
CN         1599680 A      3/2005
(Continued)

OTHER PUBLICATIONS

Examination Report issued in corresponding German Patent Application No. 10 2013 207 142.6, dated Feb. 24, 2014.
(Continued)

*Primary Examiner* — Zakaria Elahmadi
(74) *Attorney, Agent, or Firm* — Burr & Forman, LLP

(57) ABSTRACT

A worm gear has a worm wheel, a drive shaft, and a flexible shaft. The worm wheel meshes with a worm shaft, which is driven by the drive shaft. The flexible shaft can be arranged in the drive shaft with a radial gap between at least a portion of the flexible shaft and the drive shaft. The flexible shaft can be coupled to the drive shaft such that a first spring constant is provided for displacement of the flexible shaft in a radial direction within a first range and a second spring constant is provided for displacement of the flexible shaft in the radial direction within a second range.

10 Claims, 3 Drawing Sheets

(51) Int. Cl.
*F16H 55/24* (2006.01)
*F16H 57/021* (2012.01)

(58) Field of Classification Search
USPC .......... 74/388 PS, 425, 89.14; 180/428, 444
See application file for complete search history.

(56) References Cited

U.S. PATENT DOCUMENTS

| | | | | |
|---|---|---|---|---|
| 2,696,579 A * | 12/1954 | Der Veer Van | ....... | E05F 15/611 310/75 D |
| 2,780,893 A * | 2/1957 | Seborg | ..................... | B24B 33/06 192/35 |
| 3,203,690 A * | 8/1965 | Werner | .................... | F16D 7/022 192/76 |
| 3,339,426 A * | 9/1967 | Karl-Heinz | ............... | F16H 1/16 74/412 R |
| 3,349,876 A * | 10/1967 | Sheckells | .............. | E05F 15/608 188/185 |
| 3,421,753 A * | 1/1969 | Staples, Jr. | ......... | G06K 13/107 271/108 |
| 3,424,514 A * | 1/1969 | Back | ........................ | G02B 7/08 359/694 |
| 3,430,510 A * | 3/1969 | Otto | ...................... | B25B 21/002 74/425 |
| 3,430,516 A * | 3/1969 | Pickles | ................ | B60N 2/0232 192/48.2 |
| 3,434,366 A * | 3/1969 | Eisenhart | .................. | F16H 1/20 74/421 R |
| 3,487,704 A * | 1/1970 | Littmann | .................. | F16H 1/16 403/345 |
| 3,518,868 A * | 7/1970 | Cargill | ..................... | B21D 1/02 72/389.1 |
| RE27,407 E * | 6/1972 | Littmann | .............. | E05F 15/697 403/291 |
| 3,848,477 A * | 11/1974 | Giandinoto | ............... | F16H 1/16 74/412 R |
| 4,111,069 A * | 9/1978 | Blair | ..................... | F16H 57/025 74/421 A |
| 4,185,514 A * | 1/1980 | Edwards | .................... | F16H 1/16 74/421 A |
| 4,186,461 A * | 2/1980 | Leining | .................. | A22B 5/168 452/133 |
| 4,314,692 A * | 2/1982 | Brauer | .................. | E05F 11/486 254/362 |
| 4,318,573 A * | 3/1982 | Hamman | ................. | F16C 35/02 384/192 |
| 4,742,726 A * | 5/1988 | Adam | ..................... | F16C 17/08 74/425 |
| 4,935,652 A * | 6/1990 | Maxa | ................... | G01D 5/3473 310/68 B |
| 5,044,454 A * | 9/1991 | Kanazawa | ............. | B62D 5/043 180/404 |
| 5,144,849 A * | 9/1992 | Aihara | ................. | B60N 2/0224 248/429 |
| 5,221,869 A * | 6/1993 | Williams | .................. | H02K 5/24 310/40 MM |
| 5,325,736 A * | 7/1994 | Tsujita | .................... | F16C 17/26 310/90 |
| 5,768,942 A * | 6/1998 | Gruber | ............. | B25D 17/00 296/223 |
| 5,777,411 A * | 7/1998 | Nakajima | ................ | H02K 7/12 310/75 D |
| 5,836,219 A * | 11/1998 | Klingler | ................ | F16H 57/029 74/606 R |
| 5,913,608 A * | 6/1999 | Blume | ................... | F16C 17/02 384/192 |
| 6,044,723 A * | 4/2000 | Eda | ..................... | B62D 5/0409 180/443 |
| 6,182,523 B1 * | 2/2001 | Nomerange | .......... | H02K 5/161 310/90 |
| 6,288,466 B1 * | 9/2001 | Lauk | ...................... | F16C 25/08 310/91 |
| 6,305,236 B1 * | 10/2001 | Sturdevant | .............. | B25B 17/00 74/421 A |
| 6,352,006 B1 * | 3/2002 | Kurashita | ............ | B60N 2/0232 297/330 |
| 6,357,313 B1 * | 3/2002 | Appleyard | ........... | B62D 5/0409 384/255 |
| 6,431,026 B1 * | 8/2002 | Walther | .................... | B60S 1/16 310/71 |
| 6,486,577 B1 * | 11/2002 | Ursel | ..................... | H02K 7/081 310/51 |
| 6,491,131 B1 * | 12/2002 | Appleyard | ........... | B62D 5/0409 180/444 |
| 6,520,971 B1 * | 2/2003 | Perry | .................. | A61B 17/2909 606/139 |
| 6,761,244 B2 * | 7/2004 | Sano | .................... | B62D 5/0409 180/444 |
| 6,763,738 B1 * | 7/2004 | Tsutsui | ................. | B62D 5/0409 74/388 PS |
| 6,900,564 B2 * | 5/2005 | Kobayashi | ........... | B62D 5/0409 180/444 |
| 7,077,235 B2 * | 7/2006 | Eda | ...................... | B62D 5/0409 180/444 |
| 7,188,700 B2 * | 3/2007 | Eda | ...................... | B62D 5/0409 180/444 |
| 7,360,467 B2 * | 4/2008 | Segawa | ................ | B62D 5/0409 180/444 |
| 7,490,695 B2 * | 2/2009 | Segawa | ................ | B62D 5/0409 180/444 |
| 7,493,986 B2 * | 2/2009 | Kim | ...................... | B62D 5/0409 180/428 |
| 7,523,805 B2 * | 4/2009 | Imagaki | ............... | B62D 5/0409 180/443 |
| 7,665,379 B2 * | 2/2010 | Bux | ...................... | F16H 1/16 74/409 |
| 7,721,616 B2 * | 5/2010 | Augustine | ................. | F16H 1/16 74/352 |
| 7,845,475 B2 * | 12/2010 | Lin | ...................... | A63B 21/005 188/164 |
| 7,882,759 B2 * | 2/2011 | Schwendemann | ..... | H02K 7/081 74/425 |
| 7,913,802 B2 * | 3/2011 | Wilkes | ................. | B62D 5/0409 180/443 |
| 8,001,866 B2 * | 8/2011 | Song | ................... | B62D 5/0409 74/388 PS |
| 8,011,265 B2 * | 9/2011 | Menjak | .................. | B62D 1/181 74/425 |
| 8,490,508 B2 * | 7/2013 | Czechtizky | ............... | F16H 1/16 74/89.14 |
| 8,549,945 B2 * | 10/2013 | Rho | .................... | B62D 5/0409 384/256 |
| 8,590,412 B2 * | 11/2013 | Lin | .......................... | F16H 1/16 74/425 |
| 8,672,059 B2 * | 3/2014 | Williams | ................. | B66D 1/12 175/162 |
| 8,684,127 B2 * | 4/2014 | Hama | .................. | B62D 5/0409 180/444 |
| 8,695,751 B2 * | 4/2014 | Wilkes | ................. | B62D 5/0409 180/444 |
| 8,777,794 B2 * | 7/2014 | Oishi | ..................... | H02K 5/04 475/162 |
| 8,826,756 B2 * | 9/2014 | Hoffmann | ........... | B29C 45/1671 74/89.34 |
| 8,893,583 B2 * | 11/2014 | Neustifter | ............ | F16H 57/022 74/665 F |
| 8,905,185 B2 * | 12/2014 | Ko | ....................... | B62D 5/0409 180/444 |
| 8,917,001 B2 * | 12/2014 | Mao | ..................... | H01R 39/415 310/90 |
| 8,950,280 B2 * | 2/2015 | Lescorail | ................ | F16H 55/24 384/255 |
| 9,296,414 B2 * | 3/2016 | Kakutani | ................. | B62D 3/04 |
| 9,421,891 B2 * | 8/2016 | Andres | ............... | B60N 2/0232 |
| 9,748,817 B2 * | 8/2017 | Mao | .................... | H02K 7/1166 |
| 9,879,759 B1 * | 1/2018 | Mauro | .................... | F16H 1/203 |
| 2001/0040067 A1 * | 11/2001 | Murakami | ........... | B62D 5/0409 180/444 |

(56) References Cited

U.S. PATENT DOCUMENTS

| | | | | |
|---|---|---|---|---|
| 2002/0017420 A1* | 2/2002 | Kinme | B62D 5/0409 | 180/444 |
| 2002/0023514 A1* | 2/2002 | Matsukawa | F16H 1/16 | 74/425 |
| 2002/0096005 A1* | 7/2002 | Oka | B62D 5/0409 | 74/388 PS |
| 2002/0121401 A1* | 9/2002 | Shimizu | B62D 5/0409 | 180/444 |
| 2004/0029671 A1* | 2/2004 | Bock | B62D 5/0409 | 475/18 |
| 2004/0221670 A1* | 11/2004 | Becker | B60N 2/0232 | 74/411.5 |
| 2004/0254041 A1* | 12/2004 | Becker | B60N 2/0232 | 475/162 |
| 2006/0065037 A1* | 3/2006 | Koppensteiner | B21J 13/12 | 72/420 |
| 2006/0169082 A1* | 8/2006 | Clark, Jr. | F16H 1/16 | 74/425 |
| 2007/0096377 A1* | 5/2007 | Hanna | E05F 15/622 | 267/226 |
| 2010/0079020 A1* | 4/2010 | Tang | F16H 1/16 | 310/83 |
| 2010/0116582 A1* | 5/2010 | Rho | B62D 5/0409 | 180/444 |
| 2010/0293736 A1* | 11/2010 | Stefani | H02K 7/081 | 15/250.31 |
| 2011/0113904 A1* | 5/2011 | Czechtizky | F16H 1/16 | 74/89.23 |
| 2011/0147113 A1* | 6/2011 | Ko | B62D 5/0409 | 180/444 |
| 2012/0118663 A1* | 5/2012 | Mori | B60R 25/02153 | 180/444 |
| 2012/0217085 A1* | 8/2012 | Sekikawa | B62D 5/0409 | 180/444 |
| 2014/0029884 A1* | 1/2014 | Toyama | B62D 5/0409 | 384/490 |
| 2014/0105524 A1* | 4/2014 | Mueller | H02K 7/081 | 384/91 |
| 2014/0202274 A1* | 7/2014 | Durand | F16H 1/16 | 74/425 |
| 2014/0352467 A1* | 12/2014 | Kwon | F16H 1/26 | 74/400 |
| 2014/0352468 A1* | 12/2014 | Kim | F16H 25/24 | 74/409 |
| 2015/0076937 A1* | 3/2015 | Klingler | H02K 5/161 | 310/51 |
| 2015/0323054 A1* | 11/2015 | Peter | B60N 2/929 | 74/434 |

FOREIGN PATENT DOCUMENTS

| | | | | |
|---|---|---|---|---|
| DE | 19944133 A1 * | 10/2000 | | B62D 5/0409 |
| DE | 19944133 A1 | 10/2000 | | |
| JP | 2002-266987 A | 9/2002 | | |
| JP | 2006056296 A * | 3/2006 | | |
| JP | 2006056296 A | 3/2006 | | |

OTHER PUBLICATIONS

Notification of First Office Action for Chinese Application No. 201410160378.8, dated May 27, 2017.
Notification of Second Office Action CN Appln No. 201410160378.8 dated Nov. 17, 2017.

* cited by examiner

WORM GEAR

CROSS REFERENCE TO RELATED APPLICATIONS

This application claims priority to German Application No. 102013207142.6, filed on Apr. 19, 2013, the entire content of which is incorporated by reference herein.

TECHNICAL FIELD

The present disclosure relates generally to a gear for transmission of torque, and more particularly, to a worm gear.

BACKGROUND

Worm gears are used, for example, in electromechanical power steering (EPS) systems in motor vehicles, which reduce the force needed to operate a steering wheel when the vehicle is stationary or when driving at low driving speeds. The EPS assists the driver in steering by using an electric motor to augment the steering force applied by the driver or by using the electric motor to superimpose steering angles. The electric motor thus superimposes a general servo assist on the mechanical steering movement of the driver.

Various configurations of electromechanical steering systems are known. Differences in the various configurations relate to the positioning of the servo unit (e.g., motor and/or control module) and the design of the reduction gear. For example, column electromechanical power steering systems (C-EPS) and pinion electromechanical power steering system (P-EPS) are known. In both C-EPS and P-EPS configurations, a mechanical steering movement of the driver is transmitted to the electric motor, via a worm shaft, by a worm wheel operatively connected to the steering wheel. The worm wheel and the worm shaft can form a unit referred to as a worm gear.

To accommodate forces produced during operation of the worm gear and to reduce noise (e.g., to prevent or least reduce sound and vibrations perceptible to passengers within the vehicle, which is referred to as "noise, vibration, and harshness" (NVH) of a vehicle), the worm shaft and the worm wheel can be formed of different materials. For example, the worm shaft can be made of metal, while the worm wheel can be made of plastic. However, a worm wheel formed of plastic may wear more rapidly than the counterpart worm shaft formed of metal. Over the life of the worm gear, the meshing engagement of the teeth of the worm wheel with the worm shaft will vary, thereby increasing tooth backlash and accompanying rattle and vibration noise.

Another disadvantage of using plastic parts coupled to metal parts in worm gears is that fluctuations in temperature and relative humidity can affect the engagement between parts. For example, the plastic and metal parts may have significantly different coefficients of expansion and/or coefficients of water absorption. Temperature and humidity variations may thus produce different effects in the worm shaft and the worm wheel, for which current configurations may not be able to compensate. These environmental effects can also lead to rattle and vibration noise, as well as the potential for jamming or lockup of the worm gear. In addition, when reinforced plastics are used for the worm wheel, even greater amounts of expansion may occur for a given temperature fluctuation which can lead to a distortion in the worm gear. Reinforced plastics may also be susceptible to increased swelling via absorption of water from the air.

To allow for greater design tolerances during manufacturing and dimensional variations in the worm gear, it may be desirable to employ a low spring constant and/or low spring force for the worm gear. However, such a design may be at odds with an optimal operation of the worm gear, in particular, to achieve acceptable NVH behavior. For example, rattling can arise from poor intermesh engagement between the worm wheel and the worm shaft due to the lower spring force/constant when a torque from the steering wheel acts on the worm wheel and a radial force is applied to the worm shaft. Thus, a higher spring force may be desirable in the tooth engagement area.

In a worm gear, a worm shaft can be connected via a coupling to a drive shaft, which carries the rotor of an electric motor. The worm wheel and the worm shaft of the worm gear can be brought into pre-tensioned engagement. For example, pretensioning can be achieved using a radially acting spring, which acts against the tooth engagement area of the worm gear and thus adjusts the tooth backlash to ensure engagement of the worm wheel to the worm shaft with little or no play. However, since the torque of the electric motor has to be transmitted to the worm shaft via the drive shaft, one should compensate for the manufacturing design tolerances between the drive shaft and the worm shaft. In addition, space may be required outside the worm gear to accommodate the spring or another element to pretension the worm wheel against the worm shaft.

With this in mind, the object of the present disclosure is to provide a worm gear that allows for large design tolerances during manufacturing with improved NVH performance and reliability.

SUMMARY

In accordance with various exemplary embodiments, the present disclosure provides a worm gear comprising a worm wheel, a drive shaft, and a flexible shaft. The worm wheel can mesh with a worm shaft. The drive shaft can drive the worm shaft. The flexible shaft can be arranged in the drive shaft with a radial gap between at least a portion of the flexible shaft and the drive shaft.

The present disclosure also provides a worm gear comprising a drive shaft and a flexible shaft. The drive shaft can be coupled to a worm shaft. The flexible shaft can be coupled to the drive shaft such that a first spring constant is provided for displacement of the flexible shaft in a radial direction within a first range and a second spring constant is provided for displacement of the flexible shaft in the radial direction within a second range.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
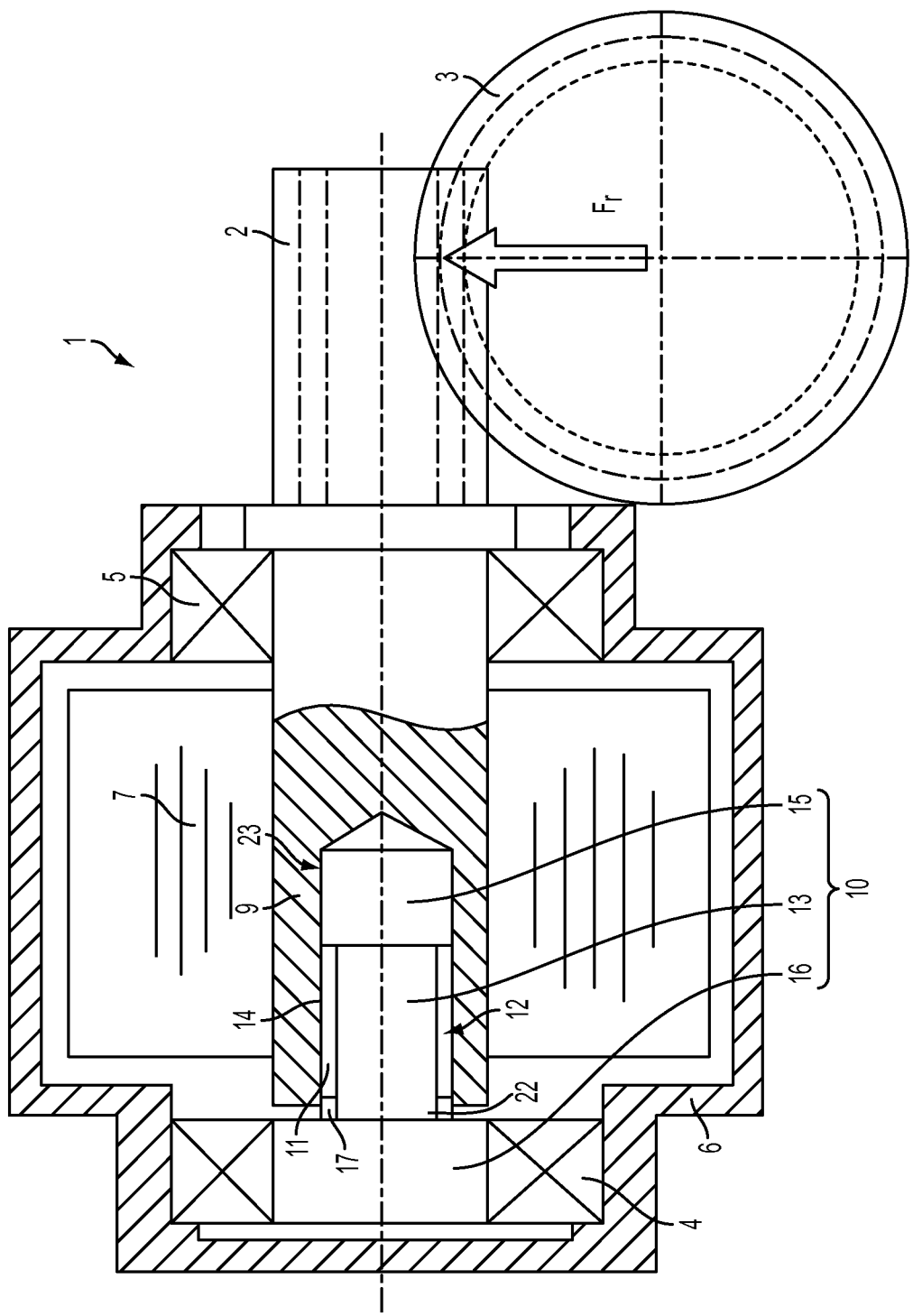
FIG. 1 is a cross-sectional view of a worm gear according to one or more embodiments of the disclosed subject matter.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a worm gear comprises a worm shaft and worm wheel. The worm shaft can mesh with a worm wheel and can be supported by at least one bearing. The worm shaft can be coupled to or part of a drive shaft, which can be driven, for example, by an electric motor. A flexible shaft can be disposed within the drive shaft, for example, in a recess of the drive shaft. For example, the flexible shaft can be coaxial with the drive shaft.

The flexible shaft can be arranged within the drive shaft such that a radial gap (e.g., an annular space) is formed, at least in parts, between the drive shaft and the flexible shaft. For small displacements, the flexible shaft may exhibit a relatively soft spring constant. At larger displacements (e.g., when the flexible shaft has displaced through the radial gap), the flexible shaft may exhibit a relatively stiff spring constant, for example, due to increased contact between the flexible shaft and the drive shaft. At least two different spring constants can be achieved as a result of the flexible shaft and drive shaft combination.

In an exemplary embodiment, the flexible shaft comprises a bearing portion, which is supported in a bearing of the housing. In another exemplary embodiment, the flexible shaft is the actual worm shaft and the bearing portion meshes with the worm wheel. In either of the above noted exemplary embodiments, at least two different spring constants are achieved.

In one or more exemplary embodiments, the worm gear is connected to a rotor of an electric motor to generate torque. For example, the electric motor can be an asynchronous or induction motor, which comprises a rotatable rotor and a stationary winding. The torque can be generated by a rotating field externally defined by control and switch elements. For example, the rotor can be a squirrel-cage rotor or a short-circuited rotor. The rotor can be arranged together with the worm shaft, e.g., the drive shaft, in a common housing. Such a motor does not require any permanent magnets. In the event of a fault in an electrical or electronic part such as a steering device of the vehicle, no magnetic field is generated as the rotor rotates that would otherwise influence or inhibit the rotational motion of the rotor. As a result, power transmission (e.g., from a steering wheel to steered wheels of the vehicle) is not adversely affected in the event of a fault.

Of course, other electric motor designs can also be used to drive the worm gear according to one or more contemplated embodiments. For example, synchronous motors can be used. These may be single-phase or polyphase (e.g., three phase) synchronous motors, in which a magnetized rotor is synchronously driven by a rotating magnetic field that moves in a surrounding stator. Alternatively, direct current (DC) motors can also be used to drive the worm shaft.

In one or more exemplary embodiments, the worm gear is used as part of a power steering device for a vehicle. The torque generated by an electric motor is transmitted via the worm gear to a steering shaft. The worm gear can comprise a worm shaft and a worm wheel, and the steering shaft can be coupled to the worm wheel. As a result, the power steering system can be used to superimpose torque and/or superimpose a steering angle. The electric motor can drive the worm shaft via a rotor supported in the housing. The worm shaft can mesh with the worm wheel supported in the transmission housing. Rotational movement of the worm wheel transfers a torque for steering and/or provides an auxiliary torque for reducing the manual force applied by the driver to a steering wheel (i.e., superimposing torque). Alternatively or additionally, the power steering can be used to vary the steering ratio between the steering wheel and the steered wheels of the vehicle by means of the worm gear, for example, as a function of the driving speed of the vehicle (i.e., superimposing steering angle).

In one or more embodiments, the disclosed worm gear can be used in lifting, opening and closing systems assisted by an electric motor. For example, such systems may include, but are not limited to, rolling shutters, garage doors, property gates, movable windows (e.g., power windows of a vehicle), sliding roofs (e.g., power sunroof/moonroof or power hardtops in a convertible vehicle), etc. In another example, the disclosed worm gear can be used as part of a drive mechanism in printers or combined copier, fax and printing machines, for example, to move paper or other printing materials. Other applications of the disclosed worm gear are also possible according to one or more contemplated embodiments.

FIG. 1 shows a lateral sectional view of a worm gear 1 according to an exemplary embodiment of the disclosed subject matter. Worm gear 1 comprises a worm shaft 2 and a worm wheel 3. The worm shaft 2 can mesh with the worm wheel 3 in a tooth engagement area and with a radial force $F_r$. The worm shaft 2 can be rotatably supported by a first bearing 4 and a second bearing 5 in a housing 6. The worm shaft and the worm wheel can be formed of the same material or different materials. For example, the worm shaft can be made of metal and the worm wheel can be made of a plastic (e.g., polyamide, an engineering thermoplastic such as polyoxymethylene, or a reinforced plastic).

An electric motor can have a rotor 7 that is also arranged in housing 6 and drives the worm shaft 2. Between the first bearing 4 and the second bearing 5 is the drive shaft 9. Drive shaft 9 can be an integral part of the worm shaft 2, i.e., integrally formed with the worm shaft 2. Alternatively, drive shaft 9 can be formed separately and connected to the worm shaft 2, e.g., via a coupling element (not shown). As used herein, the term drive shaft refers to the shaft 9 which extends between and rests on first bearing 4 and/or second bearing 5 and which is connected to or a part of worm shaft 2.

A flexible shaft 10 is arranged in the drive shaft 9, for example, in an area proximal to the first bearing 4 (e.g., at an end of the drive shaft distal from the worm wheel 3). At least a portion of the flexible shaft 10 is spaced from drive shaft 9 by a radial gap 11 (e.g., an annular gap). The flexible shaft 10 comprises a bearing portion 16, a fixing portion 15, and a middle portion 13 between the bearing portion 16 and the fixing portion 15. The bearing portion 16 can have a larger diameter than the fixing portion 15, and the fixing portion 15 can have a larger diameter than the middle portion 13.

The flexible shaft 10 can be disposed in a recess 12 of the drive shaft 9. For example, the recess 12 can be a bore in the drive shaft 9. Alternatively, the recess 12 may be milled into the drive shaft 9. In yet another alternative, the recess 12 may be a hollow recess (e.g., a cylindrical recess) formed in the drive shaft 9 during manufacture thereof (e.g., by casting or machining). In still another alternative, the flexible shaft may be disposed in a recess of the worm shaft 2. The drive shaft and/or the flexible shaft can be formed of the same material as the worm shaft or from different materials. For example, the worm shaft, the drive shaft, and the flexible shaft can all be formed of metal. In another example, the worm shaft and the drive shaft can be formed of metal and the flexible shaft can be formed of plastic.

The middle portion 13 of the flexible shaft 10 can have an outer diameter less than a diameter of the recess 12 in the drive shaft 9. As a result, a radial gap 11 is formed between the flexible shaft 10 and a wall of the recess 12, at least surrounding the middle portion 13. The radial gap 11 between the middle portion 13 of the flexible shaft 10 and the drive shaft 9 allows the flexible shaft 10 to deflect in a radial direction. The range of the radial deflection for the flexible shaft 10 is limited by the wall 14 of the recess 12 and is a function of the thickness of the radial gap, which itself is a function of the diameter of the recess 12 and the diameter of the middle portion 13. Thus, the flexible shaft 10 can deflect in the radial direction until middle portion 13 comes into contact with wall 14.

Figure 3:
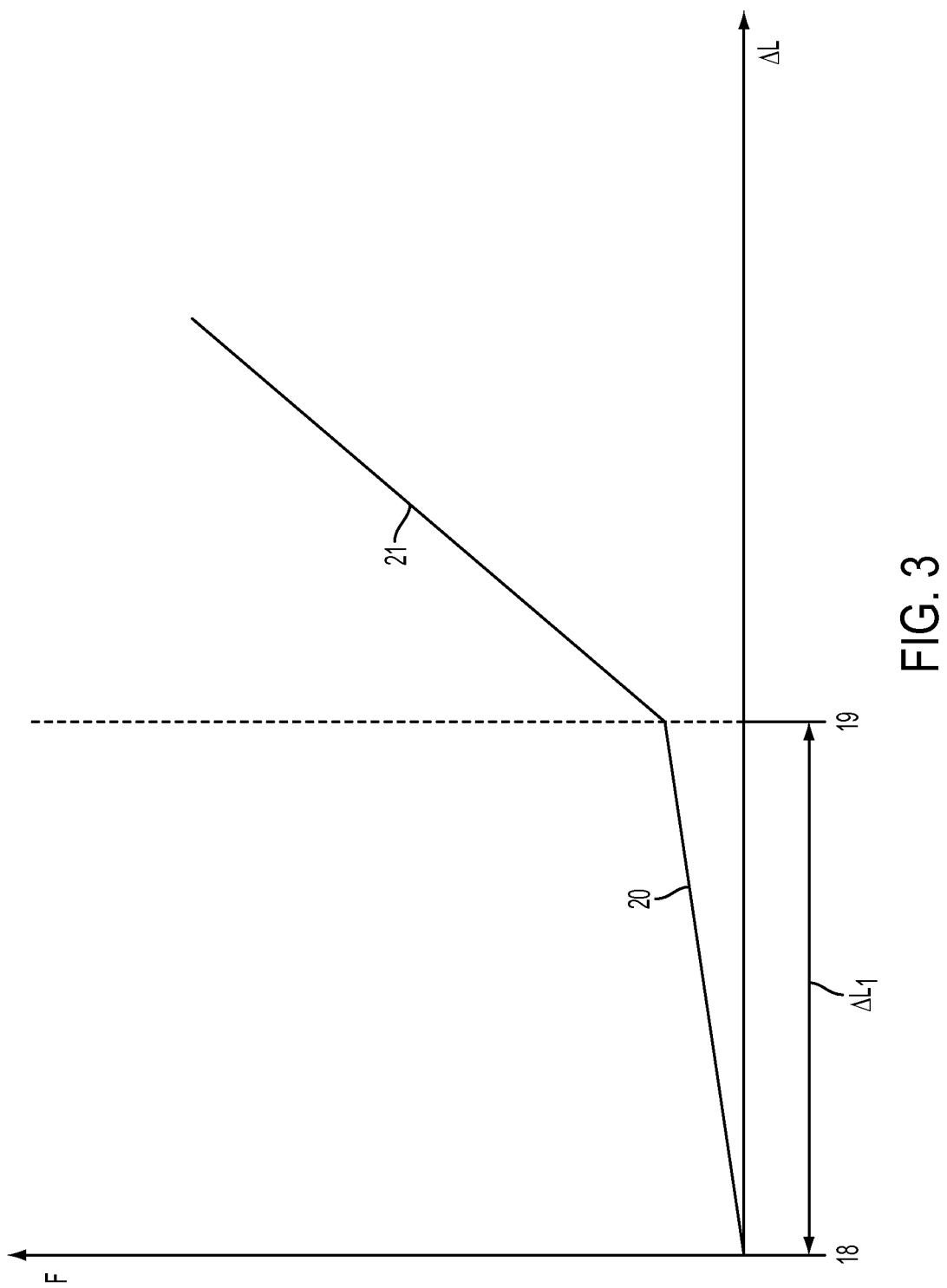
FIG. 3 is a graph illustrating force-displacement response of a worm gear according to one or more embodiments of the disclosed subject matter.

Prior to the flexible shaft 10 impacting wall 14, the spring force bearing on the worm gear 1 is relatively low. Referring to FIG. 3, this corresponds to the force displacement relationship illustrated by line 20 between points 18 and 19. However, when the flexible shaft 10 abuts the drive shaft 9 via contact between wall 14 and the middle portion 13 (e.g., at a point or along a line of contact), further deflection of the flexible shaft 10 is restrained and the spring force bearing on the worm gear 1 is increased. Referring to FIG. 3, this corresponds to the force displacement relationship illustrated by line 21 to the right of point 19. Thus, different spring constants can be achieved depending on the amount of deflection of and/or force applied to the flexible shaft 10.

Referring again to FIG. 1, the flexible shaft 10 can be connected to the drive shaft 9 via the fixing portion 15. For example, the fixing portion 15 can have a diameter greater than a diameter of the recess 12 such that contact between wall 14 and a circumferential surface of fixing portion 15 results in an interference fit or press fit 23 between the flexible shaft 10 and the drive shaft 9. For example, the fixing portion 15 can be inserted into recess 12 by pressing. As a result, longitudinal and lateral forces can be transmitted between the flexible shaft 10 and the drive shaft 9 without losses.

Alternatively or additionally, the flexible shaft 10 can be at least partially connected to the worm shaft 2 outside of the fixing portion 15. For example, the flexible shaft can be connected to the drive shaft 9 by a frictional material, a cohesive or adhesive material (e.g., glue, epoxy, etc.), a positively interlocking connection (e.g., a gear coupling, a dovetail connection, a tongue-and-groove connection, a connection fitting), by magnetic attraction, by soldering or welding, or by separate connection means, such as a bolts, screw, rivet, keyed connection, or any other connection, or by any other technique or mechanism capable of rigidly coupling the fixing portion 15 to the drive shaft 9. Alternatively, the flexible shaft 10 and the drive shaft 9 may be integrally formed to avoid press-fitting. In such a configuration, the fixing portion 15 may be omitted, and the middle portion 13 and the radial gap 11 can be formed by any suitable fabrication means, for example, by machining.

When the flexible shaft 10 is fully inserted into the recess 12, the bearing portion 16 of the flexible shaft 10 remains outside the recess 12. In addition, a part 22 of the middle portion 13 adjacent to the bearing portion 16 may also remain outside the recess 12 and can be referred to as an outer portion 22. For example, the bearing portion 16 can have an outside diameter identical to the outside diameter of the drive shaft 9.

Flexible shaft 10 can be rotatably supported in housing 6 by bearing portion 16 on first bearing 4. Thus, the drive shaft 9 can be rotatably supported at one end by the second bearing 5 and at the other end via flexible shaft 10 supported by the first bearing 4. As described above, the drive shaft 9 can be coupled to or is a part of the worm shaft 2. Since the bearing portion 16 and the drive shaft 9 may have the same outside diameters, replacement of a worm gear in existing systems, or at least the drive shaft thereof, can be performed without having to replace bearings 4 and 5 or modify housing 6. Accordingly, the worm gear 1 illustrated in FIG. 1 can be used for retrofit replacement of existing systems as well as new/original equipment in a new system.

Alternatively, bearing portion 16 of the flexible shaft 10 can have an outer diameter that is smaller or larger than the outer diameter of the drive shaft 9. For retrofit applications, the outer diameter of the bearing portion 16 or the outer diameter of the drive shaft 9 can then be accommodated, for example, by placing sleeves in bearings 4 and 5 to alter an inner diameter thereof. Alternatively, existing bearings 4 and 5 in the housing can be replaced by bearings that are matched to the outer diameter of the bearing portion 16 and/or to the outer diameter the drive shaft 9.

As noted above, the worm shaft 2, which can also form the drive shaft 9, is supported by the second bearing 5. In an area between the first bearing 4 and the second bearing 5, the worm shaft 2 comprises at least two components, e.g., the flexible shaft 10 and the drive shaft 9. Thus, the worm shaft 2 is also supported by the first bearing 4 by virtue of bearing portion 16 of flexible shaft 10. It is also possible for the flexible shaft 10 to be rotatably arranged on the second bearing 5, according to one or more contemplated embodiments. For example, the recess 12 in the drive shaft 9 could be formed in an area proximal to the second bearing 5.

An elastic element 17 (e.g., a gasket or an O-ring) can be arranged between the flexible shaft 10 and the drive shaft 9. The elastic element 17 can be disposed adjacent to (or in contact with) outer portion 22 of middle portion 13. For example, the elastic element can be in contact with an end face of bearing portion 16 and can extend into the radial gap 11 at the opening of the recess. The elastic element 17 filling the radial gap 11 at the opening may in effect form a damper element. For example, the elastic element can help prevent, or at least reduce, excessively heavy contact between the drive shaft 9 and the flexible shaft 10 and thus avoid self-locking between the flexible shaft 10 and the worm shaft 2. Alternatively or additionally, elastic element 17 may serve to smooth or dampen the abrupt change in stiffness (i.e., point 19 in FIG. 3) when middle portion 13 of flexible shaft 10 impacts the wall 14 of the recess 12.

Figure 2:
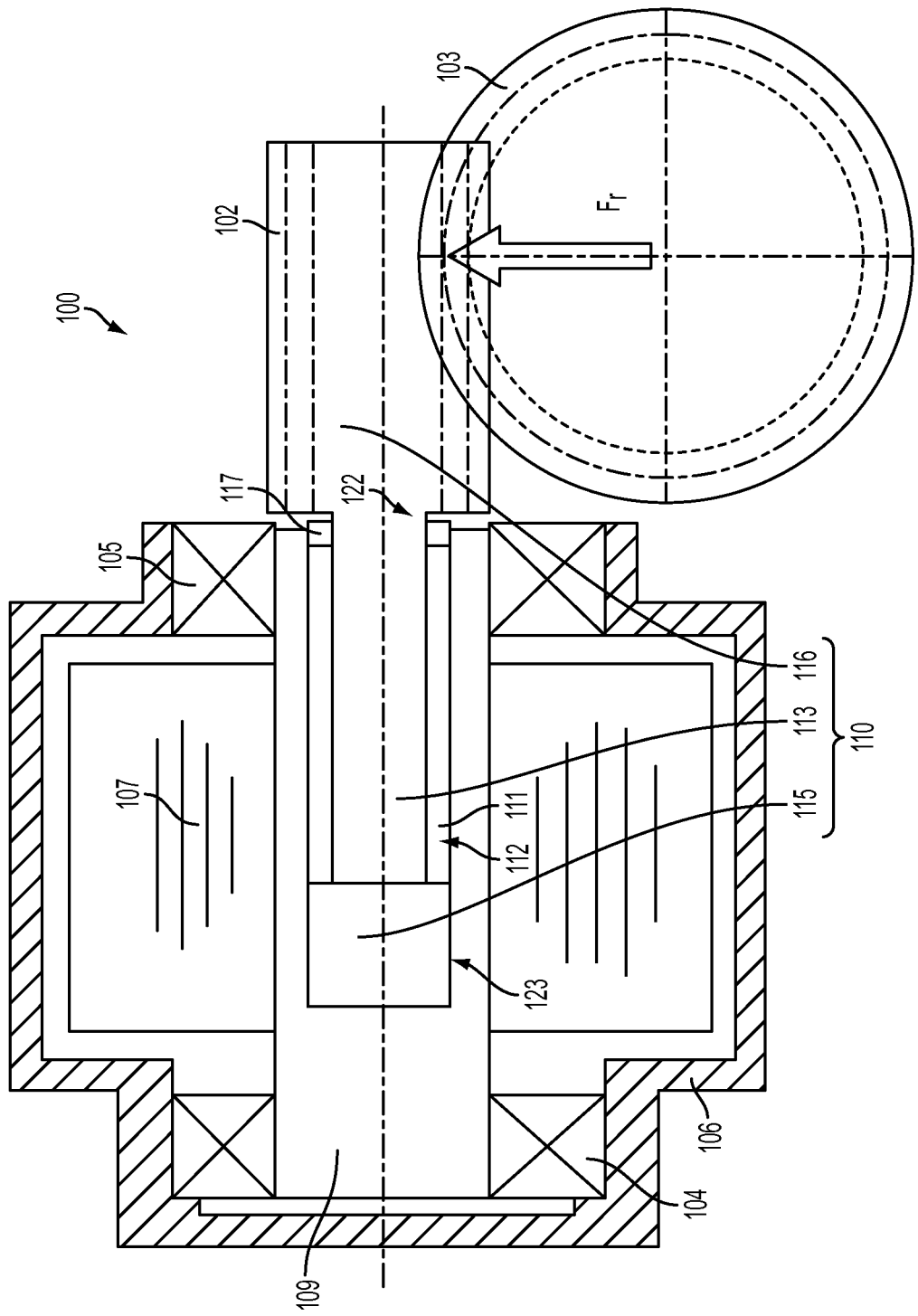
FIG. 2 is a cross-sectional view of another worm gear according to one or more embodiments of the disclosed subject matter.

Although elastic element 17 is shown as contacting the bearing portion 16, it is also contemplated that elastic element 17 may be spaced from bearing portion 16 (for example, as illustrated in FIG. 2 with elastic element 117 being spaced from the larger diameter portion of worm shaft 102). Alternatively or additionally, although the elastic element 17 is shown in FIG. 1 as extending into recess 12, it is also contemplated that the elastic element 17 may be arranged completely outside of recess 12 (e.g., only around portion 22 of the flexible shaft 10 outside of the drive shaft 9). Alternatively or additionally, although the elastic element 17 is shown in FIG. 1 as having an outside diameter similar to the diameter of recess 12, it is also contemplated that the outside diameter of elastic element 17 may be larger than the diameter of the recess 12 (e.g., such that the outer diameter of elastic element 17 falls between the outer diameter of the drive shaft 9 and the recess 12) or smaller than the diameter of the recess 12.

It is also possible to use more than one elastic element or to dispose the elastic element at different locations according to one or more contemplated embodiments. For example, multiple elastic elements 17 can be distributed in a longitudinal direction over the middle portion 13 or can be arranged on or around the middle portion 13. In another example, the elastic element 17 can be a rubber-elastic element such as a ring, tube, or two-dimensional structure that encloses at least the middle portion 13, at least partially in a radial direction and at least partially in the longitudinal direction. In yet another example, the elastic element can take the form of a rubber-elastic ring that fully encloses the middle portion 13 so as to avoid excessive frictional contact between the drive shaft 9 and the entire radial circumference of the middle portion 13 of the flexible shaft 10, which might otherwise lead to self-locking.

In the exemplary embodiment of FIG. 1, the drive shaft 9 can be formed as an integral part of worm shaft 2. The flexible shaft 10 is accommodated in the drive shaft 9, which is supported by a first bearing 4 and a second bearing 5. The flexible shaft 10 can have its bearing portion 16 supported by first bearing 4 (i.e., with the drive shaft 9 supported by second bearing 5), or its bearing portion 16 can be supported by second bearing 5 (i.e., with the drive shaft 9 supported by first bearing 4). The flexible shaft 10 can be arranged entirely within housing 6. By virtue of the rigid connection between the flexible shaft 10 and the drive shaft 9 (e.g., via interference fit 23), the flexible shaft 10 can, in effect, serve as an integral part of the drive shaft 9 even though the flexible shaft and the drive shaft may in fact be formed as separate components and later assembled together. Thus, a worm gear 1 having two spring constants can be achieved.

Referring to FIG. 2, a lateral cross-sectional view of another worm gear 100 is shown. The worm gear 100 comprises a worm shaft 102 and a worm wheel 103. The worm shaft 102 meshes with the worm wheel 103 in a tooth engagement area with a radial force $F_r$. The worm shaft 102 is in contact with the drive shaft 109, which is supported by a first bearing 104 and a second bearing 105.

Worm shaft 102 includes a flexible shaft 110, which has a fixing portion 115, a bearing portion 116, and a middle portion 113 between the fixing portion 115 and the bearing portion 116. The bearing portion 116 can be the part of the worm shaft 102 that meshes with worm wheel 103.

The flexible shaft 110 can arranged in the recess 112 of the drive shaft 109, which is arranged in the housing 106. The drive shaft 109 can be rotatably supported by the first bearing 4 and the second bearing 5. The flexible shaft 110 is connected to the drive shaft 109 via the fixing portion 115. In addition, the flexible shaft 110 can project beyond an end of the recess 112, for example, with bearing portion 116 and outer portion 122, similar to bearing portion 16 and outer portion 22 described above with respect to FIG. 1.

A maximum dimension of recess 112 around the fixing portion 115 can be smaller than the corresponding dimension of the fixing portion 115 of the flexible shaft 110, thereby creating an interference or press fit 123 between the drive shaft 109 and the flexible shaft 110. Longitudinal and lateral forces can thus be transmitted between the flexible shaft 110 and the drive shaft 109 in a lossless fashion.

Alternatively or additionally, the flexible shaft 110 can be at least partially connected to the drive shaft 109 outside of the fixing portion 115. For example, the flexible shaft can be connected to the drive shaft 109 by a frictional material, a cohesive or adhesive material (e.g., glue, epoxy, etc.), a positively interlocking connection (e.g., a gear coupling, a dovetail connection, a tongue-and-groove connection, a connection fitting), by magnetic attraction, by soldering or welding, or by separate connection means, such as a bolts, screw, rivet, keyed connection, or any other connection, or by any other technique or mechanism capable of rigidly coupling the fixing portion 115 to the drive shaft 109. In such cases, press fit 123 may be unnecessary.

The middle portion 113 of the flexible shaft 110, which adjoins the fixing portion 115, can be designed with an outer diameter less than a diameter of the recess 112 such that a radial gap 111 (e.g., an annular gap) is formed between the flexible shaft 110 and the wall of the recess 112. Similar to the embodiment of FIG. 1, the radial gap 111 between the middle portion 113 of the flexible shaft 110 and the drive shaft 109 allows the flexible shaft 110 to deflect in a radial direction until it impacts the wall of recess 112, thereby allowing the flexible shaft to provide two different spring constants based on the amount of deflection.

In order to buffer the impact of the flexible shaft 110 with the drive shaft 109, an elastic element 117 can be arranged between the middle portion 113 of the flexible shaft 110 and the drive shaft 109. For example, the elastic element 117 can be arranged adjacent to the second bearing 5 of the drive shaft 109, for example, surrounding the outer portion 122 of the middle portion 113. Such an arrangement may preclude or at least reduce the chance of self-locking between the flexible shaft 110 and the drive shaft 109. Alternatively or additionally, elastic element 117 may serve to smooth or dampen the abrupt change in stiffness (i.e., point 19 in FIG. 3) when middle portion 113 of flexible shaft 110 impacts the wall of recess 112.

Although elastic element 117 is shown as spaced from an end of the worm shaft 102, it is also contemplated that elastic element 117 may contact the worm shaft 102 (for example, as illustrated in FIG. 1 with elastic element 17 contacting the larger diameter bearing portion 16 of flexible shaft 10). Alternatively or additionally, although the elastic element 117 is shown in FIG. 2 as extending into recess 112, it is also contemplated that the elastic element 117 may be arranged completely outside of recess 112 (e.g., only around portion 022 of the flexible shaft 110 outside of the drive shaft 109). Alternatively or additionally, although the elastic element 117 is shown in FIG. 2 as having an outside diameter similar to the diameter of recess 112, it is also contemplated that the outside diameter of elastic element 117 may be larger than the diameter of the recess 112 (e.g., such that the outer diameter of elastic element 117 falls between the outer diameter of the drive shaft 109 and the recess 112) or smaller than the diameter of the recess 112.

It is also possible to use more than one elastic element or to dispose the elastic element at different locations according to one or more contemplated embodiments. For example, multiple elastic elements 117 can be distributed in a longitudinal direction over the middle portion 113 or can be arranged on or around the middle portion 113. In another example, the elastic element 117 can be a rubber-elastic element such as a ring, tube, or two-dimensional structure that encloses at least the middle portion 113, at least partially in a radial direction and at least partially in the longitudinal direction. In yet another example, the elastic element can take the form of a rubber-elastic ring that fully encloses the middle portion 113 so as to avoid excessive frictional contact between the drive shaft 109 and the entire radial circumference of the middle portion 113 of the flexible shaft 110, which might otherwise lead to self-locking.

In FIG. 2, the drive shaft 109 can be supported by the first bearing 4 and the second bearing 5 at opposite ends thereof. The flexible shaft 110 forms the worm shaft 102, where bearing portion 116 meshes with worm wheel 103. The flexible shaft 110 can be pressed into the recess 112 of the drive shaft 109 and coupled thereto by virtue of an interference fit 123 between fixing portion 115 and a wall of the recess. Drive shaft 109 can be supported in the housing 106 by both bearings 104 and 105 while a portion of the flexible shaft 110 projects out of the housing 106 to act as the worm shaft 102. The bearing portion 116, which meshes with the worm wheel 103, can have an outer diameter that is different from the outer diameter of drive shaft 109. For example, the bearing portion 116 can be configured based on the requirements of the worm wheel 103, and thus may be larger, smaller or equal in size to the outer diameter of the drive shaft 109. Thus, a worm gear 100 having two spring constants can also be achieved.

The worm shaft and the worm wheel can be formed of the same material or different materials. For example, the worm shaft can be made of metal and the worm wheel can be made of a plastic (e.g., polyamide, an engineering thermoplastic such as polyoxymethylene, or a reinforced plastic). The drive shaft can be formed of the same material as the worm shaft or from different materials. For example, the worm shaft (which serves as the flexible shaft) and the drive shaft can all be formed of metal. In another example, the drive shaft can be formed of metal and the worm shaft can be formed of plastic.

FIG. 3 is a simplified graph that illustrates the spring force response of worm gear 1 or worm gear 100. The amount of deflection (ΔL) of the flexible shaft in the direction of the applied force is plotted on the x-axis, and the amount of the applied force to obtain the corresponding deflection is plotted on the y-axis. The spring constant (i.e., k=F/ΔL) provided by the flexible shaft in response to the applied forces is reflected in the slope of the force-displacement curves 20, 21. As is apparent from the figure, worm gears according to embodiments of the disclosed subject matter are thus able to provide two different spring constants.

Between a first point 18, which represents zero displacement of the flexible shaft, and a second point 19 on the X-axis, a force-displacement curve 20 is produced for the flexible shaft 10. For example, the distance, $\Delta L_1$, between the points 18 and 19 can correspond to the width of the radial gap (e.g., the gap 11 between the middle portion 13 and the wall 14 of recess 12). As a result, the displacement of the flexible shaft is limited by the wall of the recess after it traverses a width of the radial gap, and the spring constant abruptly changes. From the point 19, which marks the abrupt change in rigidity, the middle portion contacts the drive shaft (i.e., via the wall of the recess) and the force-deflection curve 21 results.

Because of the larger spring constant, the worm gear can compensate for radial forces, $F_r$, that occur due to a torque in the tooth engagement area between the worm wheel and the worm shaft (e.g., radial forces imparted to the worm shaft 2 by a steering wheel via the worm wheel 3). At the same time, the worm gear can allow large initial deflections of the flexible shaft with a smaller force (e.g., the spring constant represented by force-deflection curve 20) to accommodate large manufacturing design tolerances in the worm gear and/or any wear of the worm gear during use and/or changes in material size due to environmental factors.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A worm gear comprising:
   a worm wheel that meshes with a worm shaft, the worm shaft comprising a supported end and an unsupported end;
   a drive shaft that drives the worm shaft;
   a flexible shaft having an end permanently fixed within a recess of the drive shaft such that the recess forms a radial gap between the flexible shaft and the drive shaft, wherein the flexible shaft comprises a fixing portion that couples the flexible shaft to the drive shaft, a middle portion spaced from the drive shaft by said radial gap, and a bearing portion disposed outside the drive shaft and supported by a first bearing;
   wherein the bearing portion of the flexible shaft has an outer diameter that is the same as an outer diameter of the drive shaft supported by a second bearing.

2. A worm gear comprising:
   a shaft comprising:
      a drive portion coupled to a worm shaft; and
      a flexible portion comprising a fixing portion that couples the flexible portion to the drive portion, a middle portion spaced from the drive portion by a radial gap, wherein the fixing portion has a greater diameter than the middle portion;
      wherein the flexible portion further comprises a bearing portion disposed outside the drive portion and supported by a first bearing and a second bearing, wherein the bearing portion of the flexible portion has an outer diameter that is the same as an outer diameter of the drive portion supported by said second bearing.

3. The worm gear of claim 2, further comprising:
   one or more bearings supporting at least one of the drive portion and the flexible portion; and
   a housing enclosing at least a portion of the drive portion, at least a portion of the flexible portion, and the one or more bearings.

4. The worm gear of claim 2, further comprising a worm wheel that meshes with the worm shaft.

5. The worm gear of claim 2, wherein the flexible portion is integrally formed with the drive portion or is coupled to the drive portion by an interference fit.

6. The worm gear of claim 2, further comprising an elastic member disposed on the flexible portion in a region outside a recess of the drive portion.

7. The worm gear of claim 2, wherein the worm shaft comprises a supported end and an unsupported end.

8. The worm gear of claim 2, wherein the flexible portion is permanently fixed to the drive portion such that a first spring constant is provided for deflection of the shaft in a radial direction of the shaft within a first range and a second spring constant greater than the first spring constant is provided for deflection of the shaft in the radial direction within a second range beyond the first range.

9. The worm gear of claim 8, wherein:
   at least a first portion of the flexible portion is disposed within a recess of the drive portion, the first portion being spaced from a wall of the recess by the radial gap,
   the first range corresponds to deflection of the flexible portion within said radial gap, and
   the second range corresponds to deflection of the flexible portion once the first portion contacts the wall of the recess.

10. The worm gear of claim 9, wherein a second portion of the flexible portion is spaced in an axial direction of the flexible portion from the first portion.

* * * * *